Aug. 25, 1931.   C. W. RICHARDSON   1,820,495

CABLE GUIDE

Filed Oct. 18, 1929

Patented Aug. 25, 1931

1,820,495

UNITED STATES PATENT OFFICE

CONLEY W. RICHARDSON, OF MARION, VIRGINIA, ASSIGNOR TO THE JEFFREY MANU-
FACTURING COMPANY, OF COLUMBUS, OHIO, A CORPORATION OF OHIO

CABLE GUIDE

Application filed October 18, 1929. Serial No. 400,636.

The present invention relates to guide pulleys, and as here disclosed, is shown and described in connection with mine locomotives for the purpose of handling the power cable which, in the manipulation of locomotives of this character, is carried by a reel which will take up or pay out the cable supplying power to the motor in accordance with the needs of the operation of the locomotive. It will be understood, however, that this disclosure is merely illustrative, and that the guide may be used in any situation or in connection with any apparatus where it finds utility.

The object of the invention is to provide a guide which will quickly respond to shifting of the cable from straight line position to angular positions relative to the guide, and maintain the cable always in proper relation to the rollers over which it passes, provision being made also for reducing friction so that the device will resond to the slightest drag of the cable tending to shift its position.

More specifically, the invention contemplates the use of a ball race, to one member of which cable rollers are attached, the axes of the cable rollers and the axis of rotation of the ball race being angularly disposed with respect to one another so that the combined result of the combination is to afford the usual anti-frictional rollers for the cable so far as its longitudinal movement is concerned, and provide also for the shifting of the position of these rollers on the ball race support when the angle of drag of the cable is shifted.

In order that the matter may be clear to those skilled in the art, the accompanying drawings illustrate one physical embodiment of the invention, and in said drawings.

Figure 1:
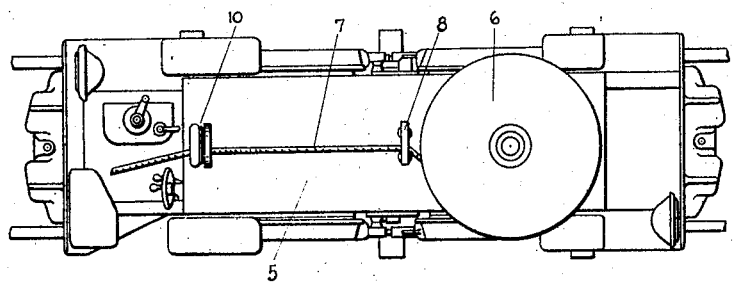
Figure 1 is a view in plan of a locomotive with the guide positioned thereon and the cable traversing the guide.
Figure 2:
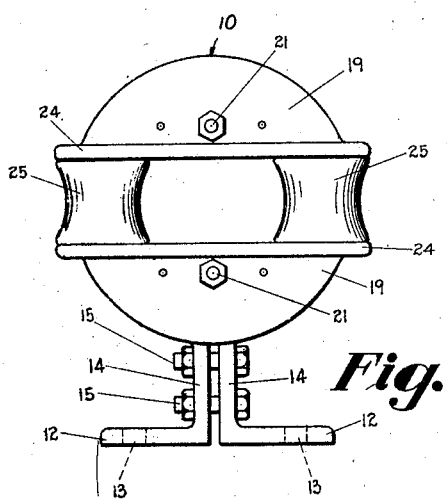
Figure 2 is a view in elevation of the improved cable guide, looking from the left, Figure 1.

Referring to the drawings by numerals, like numbers indicating like parts in the several views, the locomotive is designated by the number 5, and carries the usual cable reel 6 upon which the power cable 7 is stored, and by which reel 6 it may be taken up or paid out as desired.

Adjacent the cable 6 is a guide 8, of usual construction, having, as is customary, vertically and horizontally disposed rollers against which the cable runs.

At any convenient or appropriate point on the locomotive, the improved cable guide forming the subject of this invention may be mounted. As here shown, the cable guide 10 of my invention is placed at the rear of the locomotive and secured on the top plate.

The guide comprises any suitable support, of appropriate design, to hold it in operative position, a convenient support, as here shown, being made up of the ring 11 provided with the supporting feet 12 which may be secured to the locomotive or other apparatus, with which it is used, in any suitable manner, as by the apertures 13 through which bolts or any suitable fastening means may pass.

Figure 3:
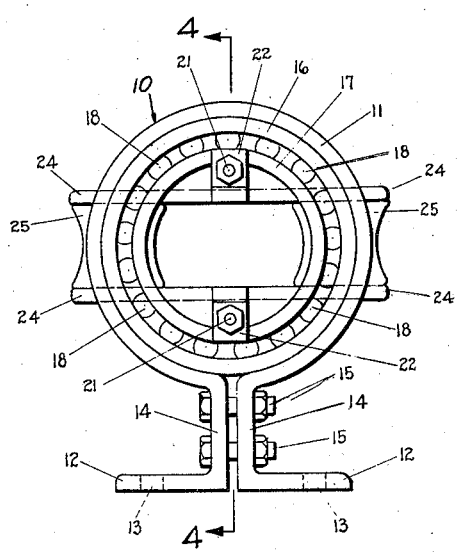
Figure 3 is a view in elevation of the device shown in Figure 2, looking from the right of Figure 1.

The legs 14 of the support 11 are bolted together or otherwise secured by the bolts and nuts 15 best shown in Figure 3, so that the ring portion of the support 11 may be clamped upon the contained parts.

Figure 4:
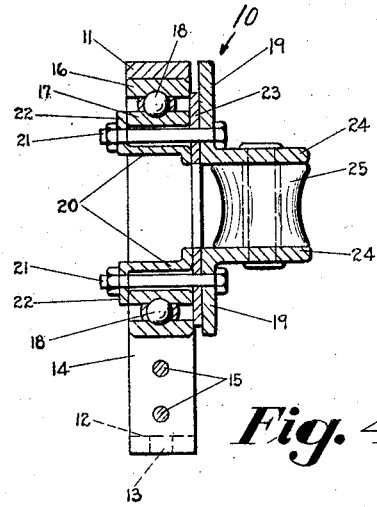
Figure 4 is a cross sectional view substantially upon the line 4—4 of Figure 3.

Mounted within the ring portion of the support 11 is a ball race made up of an outer member 16 and an inner member 17, between which the usual caged balls 18 are mounted, the outer member 16 of the race being firmly clamped by the ring section of the support 11, as best shown in Figures 3 and 4. It will be obvious that the inner race member 17 will rotate freely on the interposed balls relative to the outer member 16 of the ball race and the support.

Secured to one of the members of the ball race, here shown as the inner member, are brackets 19 of substantially right angle form, the vertical webs of these brackets being bolted to the inner race member 17 by means of clamping members 20 and bolts 21, the clamping members 20 having angularly disposed portions 22 at one end which engage the end of the ball race, the other ends of the clamps abutting a plate 23 having a central aperture and extending over the ball races, so as to cover them and prevent dirt or refuse from entering the races, this plate 23 being interposed between the ball race and the clamps and the vertical webs 19 of the roller supporting brackets.

The roller supporting brackets carry in their horizontal webs 24 cable rollers 25 of usual form, preferably concave, as shown, and designed to take the drag of the cable during its longitudinal travel through the guide.

It will be seen that when the cable 7 is being taken up by or paid out from the reel 6, that the rollers 25, so long as there is no angular shift of the cable, will serve to guide it and reduce friction, but that in event of the drag of the cable tending to displace it relative to the rollers 25 that such shift of the cable will at once rotate the member of the ball race to which the rollers are secured, and maintain the guide always in proper position with the cable engaging and traveling on the rollers 25. The ball race is obviously sensitive to any drag of the cable tending to rotate it, and will quickly and automatically adjust itself to different conditions.

While I have shown a ball race as a convenient form of rotatable support, it will be understood that other equivalent forms may be used.

Other changes from the structure here shown, within the skill of the mechanic, may be made without departing from the spirit of my invention.

I claim:

1. A cable guide comprising a support, a ball race mounted in said support, brackets secured to and rotatable with a member of said ball race, cable rollers mounted in said brackets with their axes disposed at substantially right angles to the axis of rotation of said frame, and a cover plate for said ball race disposed between said race and said brackets.

2. A cable guide comprising an annular clamping support, a ball race having its outer member clamped in fixed position by said annular support, roller supporting brackets removably mounted on the inner member of said ball race and projecting outwardly therefrom, and cable rollers mounted on said brackets with their axes disposed at substantially right angles to the axis of rotation of said ball race.

3. A cable guide comprising an annular clamping support, a ball race having its outer member clamped in fixed position by said annular support, roller supporting brackets, clamping members removably securing said brackets to the inner member of said ball race in outwardly projecting relation thereto, and cable rollers mounted on said brackets with their axes disposed at substantially right angles to the axis of rotation of said ball race.

4. A cable guide comprising an annular clamping support, a ball race having its outer member clamped in fixed position by said annular support, substantially L-shaped supporting brackets removably fastened to the inner member of said ball race, and cable rollers mounted on parallelly extending webs of said brackets with their axes disposed at substantially right angles to the axis of rotation of said frame.

5. A cable guide comprising an annular clamping support, a ball race having its outer member clamped in fixed position by said annular support, substantially L-shaped supporting brackets removably fastened to the inner member of said ball race, a ring member to cover the ball race held between said race and said brackets, and cable rollers mounted in parallelly extending webs of said brackets with their axes disposed at substantially right angles to the axis of rotation of said frame.

6. A cable guide comprising a pair of relatively rotatable concentric rings, supporting means fixed to one of the rings, a pair of angle bars secured to the other ring for rotation therewith, said bars having web portions in parallel relation to each other and in secantal relation to the rings, said web portions projecting outwardly from the rings, and cable rollers mounted in spaced relation between said web portions, the axes of said rollers lying in a plane substantially perpendicular to the axis of the rings.

In testimony whereof I have hereunto set my hand.

CONLEY W. RICHARDSON.